(12) United States Patent
Wheeler et al.

(10) Patent No.: US 6,485,676 B1
(45) Date of Patent: Nov. 26, 2002

(54) ATMOSPHERIC PRESSURE METHOD OF THERMALLY REMOVING BINDER FROM POROUS COMPACTS AND BINDER-FREE COMPACTS PRODUCED THEREBY

(75) Inventors: David Alexander Wheeler, Williamston, SC (US); Brian J. Melody, Greer, SC (US); John Tony Kinard, Greer, SC (US); Keith Lee Moore, Greenville, SC (US); Duane Earl Stenzinger, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/659,555

(22) Filed: Sep. 11, 2000

(51) Int. Cl.$^7$ ................................................. B22F 3/12
(52) U.S. Cl. ......................................................... 419/37
(58) Field of Search ...................................... 419/36, 37

(56) References Cited

U.S. PATENT DOCUMENTS 5,048,801 A * 9/1991 Johnson et al. ............. 266/256

* cited by examiner

*Primary Examiner*—Daniel J. Jenkins
(74) *Attorney, Agent, or Firm*—Banner & Witcoff, Ltd.

(57) ABSTRACT

A method of thermally removing binder from porous compacts pressed from metallic or ceramic materials using atmospheric pressure and binder-free compacts produced therefrom.

16 Claims, No Drawings

US 6,485,676 B1

ATMOSPHERIC PRESSURE METHOD OF THERMALLY REMOVING BINDER FROM POROUS COMPACTS AND BINDER-FREE COMPACTS PRODUCED THEREBY

FIELD OF THE INVENTION

The invention is directed to a method of thermally removing binder from porous compacts pressed from metallic or ceramic materials using atmospheric pressure. The invention is further directed to binder-free compacts produced with the method.

BACKGROUND OF THE INVENTION

Porous, sintered powder metallurgy and ceramic compacts have been used for many years for a wide variety of applications, including fluid filters (for both liquids and gases), oil mist eliminators, catalyst beds, electrolytic lightning arresters, electrodes for gas lighting and strobe light tubes, for oil-impregnated bearing surfaces, and for electrolytic capacitor anodes.

While some metal powders and a few ceramic powders can be pressed to significantly less than the theoretical densities of the materials without the use of a binder to help hold the pressed compacts together, most materials cannot be so-compacted successfully. Because of the poor strength of powder metallurgy or ceramic material compacts pressed at sufficiently low densities to yield significant pressed-compact porosity, most compacts pressed from these materials contain a binder which aids in increasing the pressed-compact strength prior to a sintering operation. Binders also act to lubricate the punches and dies during the pressing operation, thereby extending tooling life and minimizing downtime for press repairs/tooling changes. The presence of a binder within the pores of a powder metallurgy or ceramic compact also helps to provide an open pore structure at a given as-pressed density, resulting in effectively increased compact porosity.

For many applications, such as filters, bearings, oil mist eliminators, and gas tube electrodes, a small amount of binder decomposition products retained within the bodies of the sintered compacts presents no problem with respect to the end use of the sintered compacts. For other applications, such as catalyst beds or electrolytic capacitor anodes, binder residues, usually present as carbon or metallic carbides, present significant problems with respect to the end use of the sintered compacts. The residual carbon contamination resulting from binder decomposition/reaction tends to give rise to flaws in the anodic oxide films grown on sintered valve metal compacts used as electrolytic capacitor anodes, for example, leading to increased leakage current and short-circuit failures of the finished devices containing flawed dielectric oxide films. Although there appears not to be a threshold value for carbon contamination for tantalum anodes, for example (i.e., there does not seem to be a carbon content from binder residuals below which there is no problem and above which the onset of problems is observed), it is generally agreed upon by those in the industry that carbon should be below 100 ppm in sintered tantalum anodes and preferably as low as possible.

The highly variable purity requirements for sintered compacts, depending on the end use of the parts, has led to the use of a wide variety of binder materials. Powder metallurgy or ceramic powder compacts for those applications not requiring a low residual post-sintering carbon content are frequently pressed with binders such as paraffin, polyethylene Glycol 8000, glyptal-brand glycerine polyester, etc. For those applications requiring low residual post-sintering carbon levels, but where the particle size of the material is relatively coarse (e.g., 10 microns and larger) and the material is of a relatively inert nature (bronze, stainless steel, etc.), the above binders are still found to have merit.

For applications involving reactive materials and having low post-sintering residual carbon requirements such as tantalum powder metallurgy electrolytic capacitor anodes, there has been an ongoing search for binders having lubricity during the pressing operation and sufficiently high vapor pressure for ready removal at elevated temperatures.

One binder material used for many years in the fabrication of tantalum electrolytic capacitor anodes is ethylene diamine bis-disteramide, sold under the brand name "Acrawax" (manufactured by the Lonza Corp.) With tantalum powders having low to medium surface area, e.g., 25,000 microfarad volts/gram or approx. 0.25 square meters/gram (sintered surface area), vacuum distillation at temperatures of up to 400° C. or more will reduce the residual binder content to the point that a post-sintering anode carbon content below 100 ppm is readily achievable.

As the demand for higher surface area tantalum powders (for purposes of economy and volumetric efficiency) has led to the introduction of powders having surface areas (in the sintered state) in excess of 0.5 square meter per gram and CV products in excess of 50,000 micro farad volts (micro coulombs) per gram, it has become increasingly more difficult to reduce the residual post sintering carbon content to acceptable levels. Traditional binders, such as Acrawax, stearic acid, camphor, etc., partially decompose during vacuum distillation from high surface area tantalum powders, resulting in post-sintering carbon levels in excess of 100 ppm.

In the production environment found in the powder metallurgy electrolytic capacitor industry, it has proven impractical to press high surface area tantalum and other valve metals and valve metal compounds (such as nitrides and suboxides, etc.) into capacitor anode compacts without binder due to the dust generation, abrasive wear, and inadequate pressed compact strength associated with binderless pressing. The problem of adequate removal of binders, necessary for the efficient pressing of capacitor anodes under production conditions, from high surface area anode compacts has been solved in an ingenious manner by Tripp et al. U.S. Pat. No. 5,470,525 describes a method of water leaching of water soluble binders from tantalum anode compacts. This water leaching method of binder removal was extended to water-insoluble acidic binders, such as stearic acid, with the method of using alkali metal hydroxide leach solutions described in PCT No. WO98/38348. This last method suffers from the disadvantage of corrosive attack of the anode bodies if hot and or even mildly concentrated (5%) hydroxide solutions are employed (binder removal is more efficient with hot, concentrated solutions.) In co-pending application, Ser. No. 09/419,893, the problem of anode compact attack by the leaching solution was addressed by the substitution of one or more alkanolamines for the alkali metal hydroxide.

Unfortunately, leaching of capacitor compacts results in partial or total disintegration of the anode bodies when these are pressed from unagglomerated valve material powders. The problem can be overcome through employment of the binder (dimethyl sulfone) and vacuum distillation binder removal method described in our co-pending application Ser. No. 09/397,032.

Although the binder (dimethyl sulfone) and methods of application in the copending application were found to yield minimal residual post-sintering carbon levels with valve metal powders with both water leaching and vacuum distillation binder removal methods, these methods are not ideal from the standpoint of process cost and throughput. Water leaching requires not only a relatively large volume of high purity water, but also a post-leaching drying step to remove the residual water prior to sintering to avoid excessive out gassing during the sintering operation. Vacuum distillation removal of dimethyl sulfone from pressed capacitor anode compacts, while efficient and thorough, requires a closed system capable of withstanding both heat and vacuum, as well a vacuum pump, etc.

SUMMARY OF THE INVENTION

The invention is directed to a method of removing a binder, in particular dimethyl sulfone, from pressed compacts, such as anode bodies, comprising heating, preferably to about 100° C. and about 350° C., the pressed compacts at about atmospheric pressure and circulating or passing a sweep gas over the pressed compacts for a time sufficient to evaporate the binder from the pressed compacts and remove the evaporated binder; wherein the sweep gas is inert to the pressed compacts.

The invention is further directed to the method of removing a binder using nitrogen as the sweep gas.

The invention is further directed to the method of removing a binder using argon as the sweep gas.

The invention is further directed to the method of removing a binder using air as the sweep gas.

The invention is further directed to the binder-free compacts produced using the process of removing a binder described above.

DETAILED DESCRIPTION OF THE INVENTION

It was discovered that the binder, dimethyl sulfone, can be removed from pressed compacts, such as anode bodies, at atmospheric pressure through the use of heat and an inert cover or "sweep" gas to both prevent ignition of the anodes and to remove the evaporating binder from the vicinity of the pressed compacts.

Pressed compacts are typically produced from valve metal powders. Suitable valve metals include, but are not limited to, tantalum, niobium, and titanium. Typically, a binder is mixed with the powder prior to pressing and then the powder is pressed to form a compact such as a pellet.

The pressed binder-containing compacts are placed in an oven having inert gas blanketing ability. Preferably, the pressed compacts are placed on an open-frame rack to allow circulation of the atmosphere around the pressed compacts. An inert gas is injected into the oven to provide an inert cover. This inert gas is known as a "sweep" gas. Depending upon whether the oven is a lab oven or a production oven, the sweep gas is either circulated or passed over the pressed compacts in a single pass. In either case, the sweep gas provides an effective inert cover.

By atmospheric pressure, it is meant pressure values from about local atmospheric pressure to about 125% atmospheric pressure.

The pressed compacts are heated to about 100° C. to about 350° C., typically to about 125° C. to about 325° C., more typically about 150° C. to about 300° C., preferably about 250° C. The amount of time needed to remove the binder varies depending on several factors. For example, if the load of pressed compacts is relatively large and/or the temperature employed is relatively low, e.g. 150° C., then the time required to remove the dimethyl sulfone binder will be longer than if the pressed compacts are relatively small, the total amount of material to be processed is relatively small, and/or the maximum temperature is relatively high, e.g. 300° C.

The type of inert sweep gas depends upon the maximum process temperature and the nature of the material from which the binder containing compacts have been pressed. For most applications, nitrogen is an effective and preferred inert gas. For very finely divided tantalum, niobium, or titanium metals processed at temperatures above 300° C., a true inert or noble gas such as argon, helium, or mixtures thereof is preferred. For lower temperature removal of dimethyl sulfone binder from compacts pressed from oxidation resistant materials, such as tantalum nitride or titanium nitride, the sweep gas may be ordinary air. In this case there is very little reaction with the compacts during the atmospheric pressure binder removal step, particularly at binder removal temperatures of 250° C. and below. In general, the sweep gas should be relatively inert toward the material the compacts are made of and at the maximum binder removal temperature employed.

The inert gas is injected at a rate suitable for creating the desired atmosphere around the compacts. Generally the rate of injection is between 1 and 1000 cubic feet per hour per cubic foot of oven volume and, typically is 10 to 100 cubic feet per hour per cubic foot of oven volume.

EXAMPLES

Example 1

Anode compacts were pressed from Showa S506 tantalum powder containing 2% dimethyl sulfone (−100 mesh) binder which had been incorporated via dry blending. The anode weight was 0.260 gram This design would normally be used to produce surface mount tantalum capacitors rated: 470 MFD/10 volts.

Half of the anode compacts were processed through the traditional vacuum distillation binder removal process in which the anodes were exposed to a temperature of 350° C. for 1 ½ hours while under vacuum.

The other half of the anode compacts were placed in the circulating atmosphere oven with a nitrogen blanket. More specifically, the anode compacts were placed in a Blue M oven having inert gas blanketing ability. The anode compacts were contained in 5 inch diameter tantalum crucibles. Each crucible of anodes was placed on a horizontal shelf of stainless steel supported by an open-frame stainless steel rack. The oven atmosphere was circulated past the crucible of anode compacts supported by the stainless steel shelf. Nitrogen was injected into the oven at a rate of at 200 cubic feet per hour to provide an inert cover and "sweep" gas. The excess gas escaped through a nearly closed oven vent.

Initially, one half hour was allowed to displace the air from the oven. The anode compacts were then heated:

10 minutes—75° C.

10 minutes—150° C.

30 minutes—250° C.

The heat was turned-off and the oven allowed to cool to below 60° C. before removing the anode compacts. The anodes were vacuum sintered at 1405° C. for 15 minutes. The carbon and oxygen analysis is given below:

|  | Carbon | Oxygen |
| --- | --- | --- |
| Incoming TA Powder | 35 ppm | 2810 ppm |
| After vacuum binder removal | 76 ppm | 3790 ppm |
| After atmospheric pressure binder removal | 51 ppm | 3693 ppm |
| After vacuum binder removal and sintering | 38 ppm | 4963 ppm |
| After atmospheric pressure binder removal, sintering | 42 ppm | 5030 ppm |

The "sweep gas" atmospheric pressure thermal binder removal process gives essentially equivalent results to the vacuum/ thermal distillation binder removal with dimethyl sulfone binder, as indicated by post-sintering carbon and oxygen analysis.

The above results may be compared to the results obtained with 2% polypropylene carbonate binder in anode compacts of the same rating, pressed from the same S506 tantalum powder, followed by vacuum distillation (350° C./1 ½ hours and sintering (1405° C./15 min).

Post sintering carbon content=114 ppm

Post sintering oxygen content=6961 ppm

The use of dimethyl sulfone binder provides results superior to polypropylene carbonate binder.

Example 2

In order to determine the efficacy of the binder removal process of the invention with a ceramic material, anode compacts were pressed from tantalum nitride (H. C. Starck) containing 2% dimethyl sulfone binder, incorporated by dry-blending using powdered (−100 mesh) dimethyl sulfone. The anode compact weight was 0.070 gram.

The anode compacts were then processed through binder removal and sintering operations. Half of the anode compacts were processed through a conventional vacuum distillation, as described in Example 1. The other half of the anode compacts were processed through the atmospheric pressure, sweep gas thermal removal process, as described in Example 1. The anode compacts were then vacuum-sintered at 1700° C. for 20 minutes.

Anodes analysis for Carbon and Oxygen are as follows:

|  | Carbon | Oxygen |
| --- | --- | --- |
| As received powder | 24 ppm | 2036 ppm |
| Post vacuum distillation binder removal | 15 ppm | 2658 ppm |
| Post atmospheric pressure binder removal | 39 ppm | 2696 ppm |
| Post vacuum distillation binder removal and sintering | 15 ppm | 2950 ppm |
| Post atmospheric pressure binder removal and sintering | 3 ppm | 3126 ppm |

Thus the process of the present invention gives essentially equivalent results with those obtained by vacuum distillation binder removal with the ceramic, tantalum nitride, so far as carbon and oxygen analyses of the sintered anode compacts are concerned.

Example 3

Another valve-metal derived material, niobium monoxide, NbO (H. C. Starck), was dry blended with powdered dimethyl sulfone (−100 mesh). The binder-blended niobium monoxide was pressed into capacitor anode compacts weighing approx. 0.035 gram. Approximately 2000 of these anode compacts were placed in a 5 inch tantalum crucible having a number of small holes in it sufficient to allow water to circulate in contact with the anode compacts, but small enough to retain the anode compacts, upon immersion in a vessel of stirred water.

This crucible of anode compacts was suspended in a 6 liter stainless steel beaker of de-ionized water at 85° C., stirred by a magnetic stirring bar. Time of immersion was 10 minutes. The crucible of anode compacts was then removed from the beaker and the wash water was discarded. The wash cycle was repeated an additional 2 cycles, each time with fresh water. The anodes were then dried at a temperature about 50° C.

Approximately 2,000 additional anode compacts were placed in a 5 inch diameter tantalum crucible and these anodes were subjected to the atmospheric pressure binder removal process of the present invention as described in Example 1.

Both groups of anode compacts were then vacuum sintered at 1500° C. for 20 minutes. The carbon and oxygen analyses for these anodes is below:

|  | Carbon | Oxygen |
| --- | --- | --- |
| Incoming powder | 19 ppm | 150,900 ppm |
| Post water-wash binder removal | 178 ppm | 146,950 ppm |
| Post atmospheric pressure thermal binder removal | 140 ppm | 146,400 ppm |
| Post water-wash binder removal and sintering | 76 ppm | 146,200 ppm |
| Post atmospheric pressure thermal binder removal | 69 ppm | 145,500 ppm |

For niobium monoxide containing dimethyl sulfone binder, the atmospheric pressure thermal binder removal process of the invention gives equivalent results to those obtained via water-washing the anodes.

What is claimed is:

1. A method of removing, at about atmosphere pressure, a binder from pressed compacts containing a binder comprising heating the pressed compacts at the about atmospheric pressure and circulating or passing a sweep gas over the pressed compacts for a time sufficient to evaporate the binder from the pressed compacts and remove the evaporated binder; wherein the sweep gas is inert to the pressed compacts and wherein the binder is dimethyl sulfone.

2. The method of claim 1 wherein the pressed compacts are anode bodies.

3. The method of claim 1 wherein the atmospheric pressure is about local atmospheric pressure to about 125% of local atmospheric pressure.

4. The method of claim 1 wherein the pressed compacts are heated to from about 100° C. to about 350° C.

5. The method of claim 1 wherein the pressed compacts are heated to from about 125° C. and about 325° C.

6. The method of claim 1 wherein the sweep gas is nitrogen.

7. The method of claim 1 wherein the sweep gas is argon, helium, or mixtures thereof.

8. The method of claim 1 wherein the sweep gas is air.

9. Binder-free compacts prepared by removing, at about atmospheric pressure, a binder from pressed compacts containing a binder comprising heating the pressed compacts at the about atmospheric pressure and circulating or passing a sweep gas over the pressed compacts for a time sufficient to evaporate the binder from the pressed compacts and remove the evaporated binder; wherein the sweep gas is inert to the pressed compacts and wherein the binder is dimethyl sulfone.

10. The binder-free compacts of claim 9 wherein the pressed compacts are anode bodies.

11. The binder-free compacts of claim 9 wherein the atmospheric pressure is about local atmospheric pressure to about 125% of local atmospheric pressure.

12. The binder-free compacts of claim 9 wherein the pressed compacts are heated to from about 100° C. to about 350° C.

13. The binder-free compacts of claim 9 wherein the pressed compacts are heated to from about 125° C. and about 325° C.

14. The binder-free compacts of claim 9 wherein the sweep gas is nitrogen.

15. The binder-free compacts of claim 9 wherein the sweep gas is argon, helium, or mixtures thereof.

16. The binder-free compacts of claim 9 wherein the sweep gas is air.

* * * * *